(No Model.)

G. E. BURT.
SELF ADJUSTING SPLINE OR KEY.

No. 248,400. Patented Oct. 18, 1881.

Witnesses:
E. E. Burt.
A. C. Burt.

Inventor:
George E. Burt.

UNITED STATES PATENT OFFICE.

GEORGE E. BURT, OF HARVARD, MASSACHUSETTS.

SELF-ADJUSTING SPLINE OR KEY.

SPECIFICATION forming part of Letters Patent No. 248,400, dated October 18, 1881.

Application filed March 7, 1881. (No model.)

*To all whom it may concern:*

Be it known that I, GEORGE E. BURT, of Harvard, in the county of Worcester, and State of Massachusetts, have invented a new and useful Improvement in Constructing Spline or Key Seats in Shafting, Pulleys, Gearing, &c., of which the following is a specification.

The invention relates to the construction and arrangement of key or spline seats in shafting and the hubs of gearing in such a manner that the key-seat shall be self-adjusting.

Heretofore key or spline seats have been cut into the shafts perpendicular with the center of the shaft by a cutter that made a slot the desired width of the key. The shoulders must be exactly alike on each side. This makes the seat in the shaft. A slot is also cut into the hub, the shoulders of which must be exactly equal, and these two slots must be of sufficient depth to receive the key. Each of the tools used to slot the shaft and hub must be of exact size, and the workmen must make the keys to fit on all four sides. This requires much skill and time on the part of the workmen. Also, the tools for making the key-seats wear unequally by use, so, although exactly alike when new, vary some in the use of them; and if the slots are unlike in width it is very difficult to get a good fit on the key, and if the keys do not fit on all sides the gearing is liable to work and get loose on the shaft, causing much trouble and expense in repairs. It is also often necessary to set cranks and gearing exactly parallel with the shaft and have the cogs in a line with each other. This requires a skilled workman and great care in cutting the key-seats both in the shaft and hub, as a very minute variation in the key-seat will increase as you enlarge the diameter of the gear or lengthen the sweep of the crank.

The object of my invention is to so construct and arrange a spline or key seat that it will be self-adjusting and a common workman shall be able to make as good a four-sided fit on the key, hub, and shaft as the most skilled workmen, and do it with less time and expense.

In the accompanying drawings, like letters indicate like parts.

Figure 1:
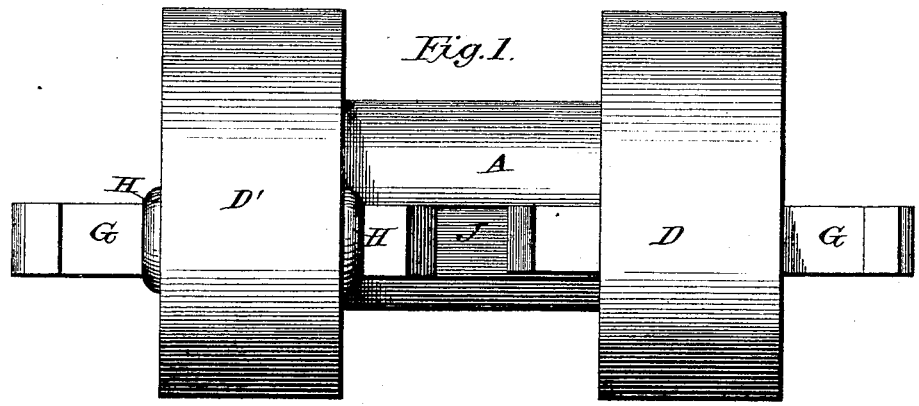
Figure 4:
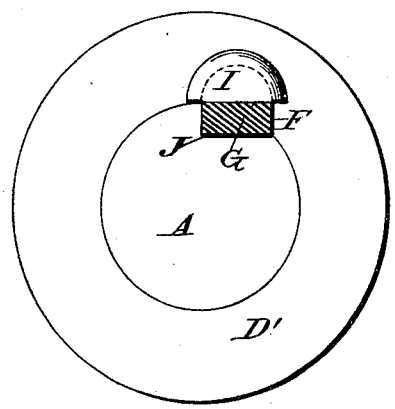
Figure 2:
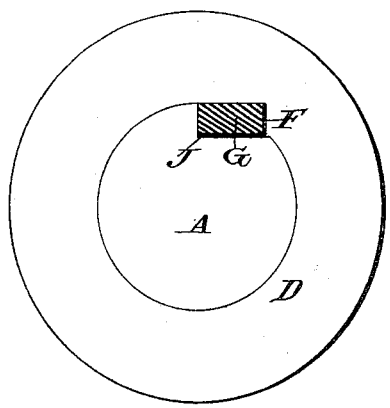
Figure 3:

Figure 1 is a top view, showing the shaft keys and hub attached to the shaft. Fig. 2 is an end view, showing the position of the keys and their seats in the shaft and hub. Fig. 3 is a top view of the auxiliary rocking attachment to fit the various taper of keys and spline. Fig. 4 is an end view of the auxiliary attachment hub, shaft, key, and their seats.

To construct the self-adjusting key-seat, I slab off a portion of the shaft at right angles with the center of the shaft, and leave a shoulder sufficient for the thickness of the spline or key. (Shown in Figs. 1, 2, 3 by the seat J.)

I construct the seat F in the hub D at a right angle with the center of the hub, and of sufficient depth for the key with its shoulder opposite to the shoulder in the shaft A. These two cuts in the hub and shaft make the seat for the key G.

I construct the auxiliary rocking seat H half-round transversely, and of a rocking form longitudinally, so it will rest in the center of the hub D', fitting into the half-round seat I.

Operation: It will be seen that the two parts which form the key and spline seat are independent, to admit of variation in the width of keys. This is shown by exchanging the keys in their seats, substituting the wide one for the narrow, or vice versa, by simply turning the hub on the shaft sufficient for the key to bear on the shoulders of the shaft and hub, and the key G being placed the entire width on one side of the center of the shaft A and hub D. Then by driving the key into its seat J it tends to hold the two shoulders of the key-seat F and J firmly against the key G. Now, if force is applied in one direction, the square shoulders against the key hold the hub and shaft firmly; also, if force is used in the opposite direction it acts against the right-angle position of the key G (shown in Figs. 1, 2, 3) in the shaft A, causing the hub to impinge and gripe the shaft very firmly, both keys fitting the same seat. The key, also resting against its projection in the seat of the hub, gives strength and resistance to hold the hub and shaft firmly in position, and thus effectually securing them against any liability of becoming loose by the work or power applied or by the backlash of the machinery; and by the use of the auxiliary rocking key-seat H the keys G may be made more or less tapering, and the rocking seat, having a bearing in the center of seat I, will rock to fit the difference in the taper. This device will always bring the impinging or bearing surface in the center of the hub, and the tendency to rock and thus throw out of true a pulley or gear that had a loose fit on the shaft is in a measure overcome, and the fitting of the key is simplified. So, also, are the tools that are used to make this adjustable key-seat. With the common key-seat the tools must be made exact, also have a number of sizes for the different-sized keys; but with this arrangement a cutter that is wide enough to cut the widest key-seat wanted will answer for all the sizes down to the smallest and require no more exactness in their make.

What I claim is—

1. In combination with the adjustable key or spline seat, the auxiliary rocking seat I and spline D, substantially as described, for the purpose set forth.

2. The combination of the adjustable key or spline seat, the shaft A, hub B, and key D, arranged substantially as described.

GEORGE E. BURT.

Witnesses:
E. E. BURT,
A. C. BURT.